United States Patent [19]

Hayashi

[11] Patent Number: 4,550,985
[45] Date of Patent: Nov. 5, 1985

[54] LIGHT DEFLECTOR
[75] Inventor: Kiyoshi Hayashi, Takatsuki, Japan
[73] Assignee: Mita Industrial Co., Ltd., Japan
[21] Appl. No.: 384,316
[22] Filed: Jun. 2, 1982
[30] Foreign Application Priority Data Jun. 17, 1981 [JP] Japan .................................. 56-92353

[51] Int. Cl.[4] .......................... G02B 27/17; G03C 1/10
[52] U.S. Cl. ...................................... 350/6.3; 350/6.2; 350/96.20
[58] Field of Search ................... 350/6.3, 96.18, 96.20, 350/6.2

[56] References Cited

U.S. PATENT DOCUMENTS

| | | |
|---|---|---|
| 3,192,391 | 6/1965 | Ressler . |
| 3,210,462 | 10/1965 | Trott . |
| 3,240,106 | 3/1966 | Hicks ..................................... 350/6.2 |
| 3,325,594 | 6/1967 | Goldhammer et al. . |
| 3,961,194 | 6/1976 | Simon et al. . |

FOREIGN PATENT DOCUMENTS

| | | |
|---|---|---|
| 2016498 | 10/1977 | Fed. Rep. of Germany . |
| 2337894 | 8/1977 | France . |
| 1157769 | 7/1969 | United Kingdom . |
| 1587531 | 4/1981 | United Kingdom . |
| 0175977 | 12/1965 | U.S.S.R. . |

OTHER PUBLICATIONS

Tomlinson, "Applications of GRIN-Rod Lenses in Optical Fiber Communication Systems", vol. 19, No. 7, 4-1980; pp. 1127-1138.
Mito et al., "Electrically Driven Rotating Mirror Type Multichannel Optical Switch," Electronic Communication Soc. Nat. Conf., No. 860, 3/78, pp. 1-4.

Primary Examiner—John K. Corbin
Assistant Examiner—Rebecca D. Gass
Attorney, Agent, or Firm—Beveridge, DeGrandi & Weilacher

[57] ABSTRACT

A light deflector comprising a rotating member provided with at least one light transmitting means having an input terminal and an output terminal. In this light deflector, with the rotation of the rotating member, a light beam put into the light transmitting means from the input terminal exits from the output terminal as a light beam to be rotatingly scanned about the rotating axis of the rotating member as a center.

5 Claims, 8 Drawing Figures

LIGHT DEFLECTOR

FIELD OF THE INVENTION

This invention relates to a light deflector, and more specifically, to a light deflector suitable for scanning a laser beam on a photosensitive material in a light scanning imaging device utilizing a laser beam, such as a laser printer or a laser facsimile.

DESCRIPTION OF THE PRIOR ART

In recent years, light scanning imaging systems utilizing a laser beam, such as a laser printer or a laser facsimile, have been proposed and come into commercial acceptance. In such light scanning imaging systems, it is necessary to scan on a photosensitive material a laser beam having information required for the formation of an image. Light deflectors already in commercial use for performing such scanning include a galvanomirror, a polygon mirror and an acousto-optic element (See, for example, Japanese Laid-Open Patent Publication Nos. 30044/1979, 31740/1979 or 115254/1979).

As is known to those skilled in the art, the galvanomirror has the serious defect of being extremely low in the speed of scanning, and the acousto-optic element suffers from the serious defect of having a small maximum deflecting angle and a low resolving power. Hence, the polygon mirror is used most generally. The polygon mirror, too, has the defect that the cost of its production is very high because it should be produced very precisely, for example with regard to the surface accuracy of each of a plurality of mirrors and the angle between mirrors.

SUMMARY OF THE INVENTION

It is a primary object of this invention to provide a novel and excellent light deflector which is free from the aforesaid defects of conventional light deflectors.

According to this invention, there is provided a light deflector comprising a rotating member provided with at least one light transmitting means having an input terminal and an output terminal, wherein with the rotation of the rotating member, a light beam put into the light transmitting means from the input terminal is delivered from the output terminal as a light beam to be rotatingly scanned about the rotating axis of the rotating member as a center.

DETAILED DESCRIPTION OF THE PREFERRED EMBODIMENTS

Figure 1:
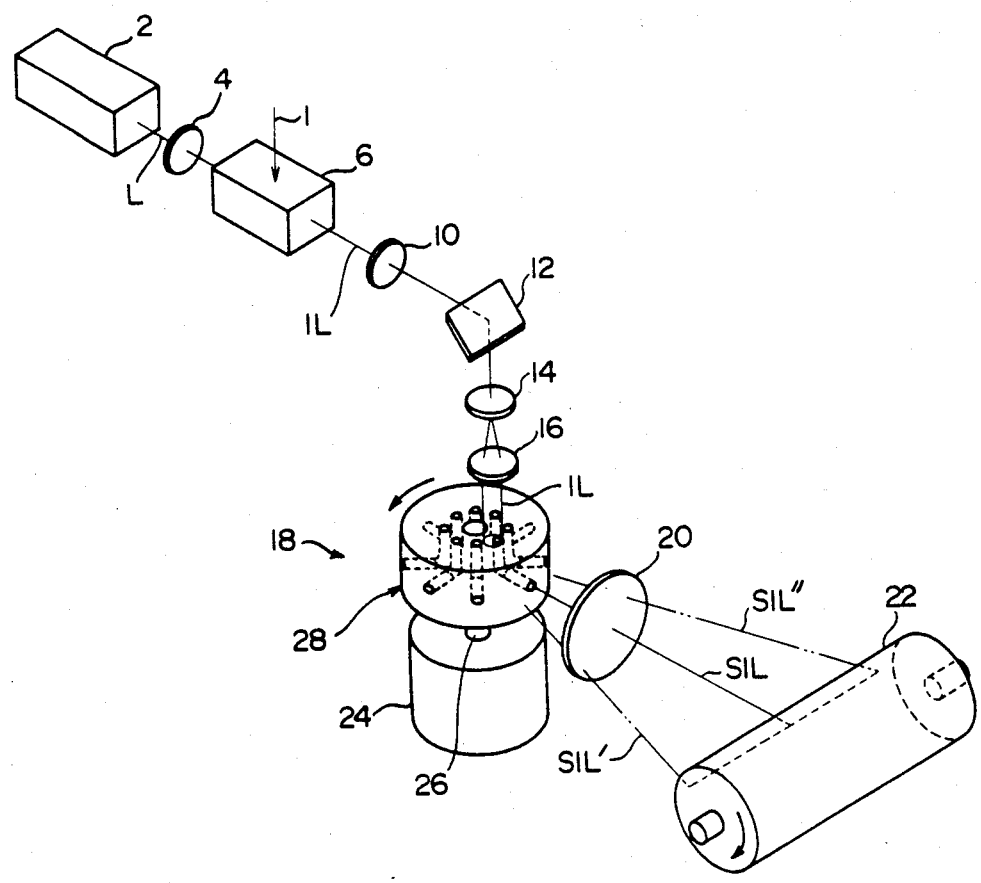
FIG. 1 is a simplified view of one example of a laser printer to which one specific embodiment of the light deflector constructed in accordance with this invention is applied.

With reference to FIG. 1 which shows in a simplified form one example of a laser printer to which the light deflector constructed in accordance with this invention is applied, a laser beam L outputted from a laser oscillator 2 is put into a light modulator 6 through an optical lens 4. Together with the laser beam L from the laser oscillator 2, an electrical signal I having information required for the formation of an image which is, for example, an output signal from a computer is fed into the light modulator 6 which can be constructed of, for example, a commercially available acousto-optic element. The laser beam L is modulated by the electrical signal I, and is delivered from the light modulator 6 as a laser beam IL having information required for the formation of an image. The laser beam IL outputted from the light modulator 6 is put into the light deflector constructed in accordance with this invention and shown generally at 18 through an optical lens 10, a reflecting mirror 12, an optical lens 14 and an optical lens 16 as a laser beam IL having a required beam diameter. The laser beam IL put into the light deflector 18 is delivered from the light deflector 18 as an output laser beam SIL to be rotatingly scanned over an angular range shown by two-dot chain lines SIL' and SIL", as will be described in greater detail hereinbelow. The laser beam SIL outputted from the light deflector 18 is projected through an optical lens 20 onto a photosensitive material disposed on the peripheral side surface of a rotating drum 22 to be rotated in the direction of an arrow. The optical lens 20 has so-called f-θ characteristics, and uniforms the scanning speed on the photosensitive material (i.e., the moving speed in the rotating axial direction of the rotating drum 22) of the output laser beam SIL to be rotatingly scanned over the angular range shown by the two-dot chain lines SIL' and SIL". Thus, the photosensitive material disposed on the peripheral side surface of the rotating drum 22 is rotatingly scanned by the output laser beam SIL having information required for the formation of an image, and by a suitable latent electrostatic image-forming method known to those skilled in the art, a latent electrostatic image corresponding to the output laser beam SIL is formed on the photosensitive material. The latent electrostatic image formed on the photosensitive material is developed into a visible image and then transferred to a suitable copying paper, or first transferred to a suitable copying paper and then developed into a visible image. As a result, an image corresponding to the output laser beam SIL, and therefore to the electrical signal I fed to the light modulator 6, is formed on the copying paper.

The laser printer shown in FIG. 1 is only one example of the application of the light deflector 18 constructed in accordance with this invention, and those constituent elements in the laser printer shown in FIG. 1 which are other than the light deflector 18 may be such elements as are known to those skilled in the art. Hence, a detailed description of the constituent elements of the laser printer in FIG. 1 which are other than the light deflector 18 is omitted in this specification.

Figure 2:
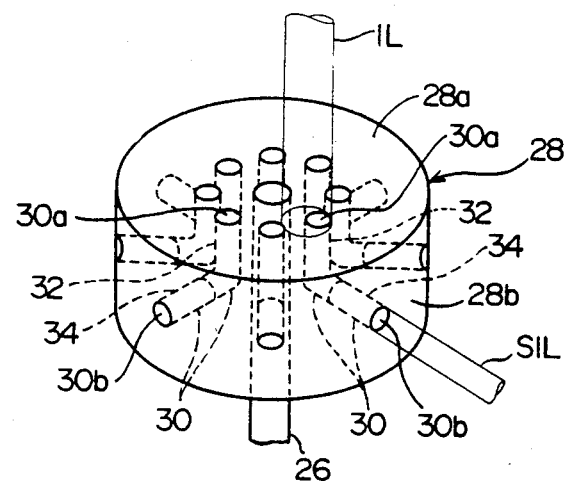
FIG. 2 is a perspective view of the rotating member of the light deflector used in the laser printer shown in FIG. 1.
Figure 3:
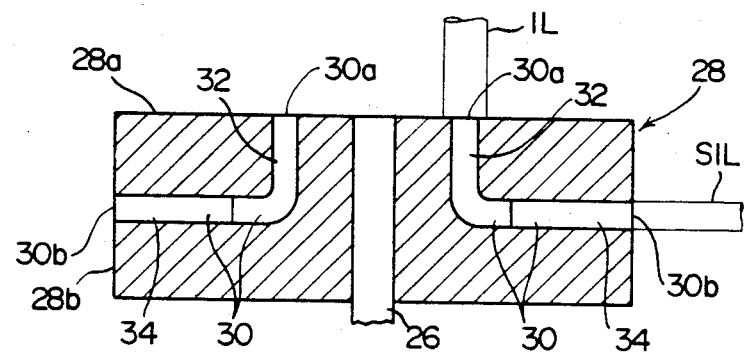
FIG. 3 is a sectional view of the rotating member of the light deflector used in the laser printer shown in FIG. 1.

Now, with reference to FIGS. 2 and 3 together with FIG. 1, the light deflector 18 constructed in accordance with this invention is described in detail. The light deflector 18 shown in the drawings is comprised of a supporting base portion 24, a rotating main shaft 26 rotatably supported on the supporting base portion 24 and a rotating member 28 fixed to the main rotating shaft 26. The rotating main shaft 26 is drivingly connected to a suitable drive source (not shown) such as an electric motor provided within the supporting base portion 24. The rotating main shaft 26 and the rotating member 28 fixed to it are rotated by the drive source at a predetermined speed in the direction of the arrow.

It is important that the rotating member 28 which is cylindrical in the illustrated embodiment should include at least one light transmitting means 30. In the illustrated embodiment, eight light transmitting means 30 are provided in the rotating member 28 at equiangular intervals. Each of the light transmitting means 30 has an input terminal 30a disposed on the upper end surface 28a of the cylindrical rotating member 28 and an output terminal 30b disposed on its peripheral side surface 28b. It is convenient, although not always necessary, that the input terminal 30a and the output terminal 30b are disposed at the same angular position in all of the light transmitting means 30.

The light transmitting means 30 itself may be comprised of a suitable optical element which can transmit light applied to its input terminal 30a to its output terminal 30b and deliver it therefrom. Conveniently, it is constructed of an optical fiber 32 disposed on the input side and a rod lens 34 disposed on the output side. The optical fiber 32 can be freely bent and therefore enables the positions of the input terminal 30a and the output terminal 30b of the rotating member 28 to be properly selected. It is known on the other hand that by properly selecting the length of the rod lens, the light delivered therefrom may be a parallel light or converged light, and therefore, the light to be rotatingly scanned, which is outputted from the light deflector 18, can be made a parallel light or converged light as necessary. One example of the rod lens is an elongated cylindrical optical glass sold under the tradename "Selfoc Microlens (SML)" by Nippon Sheet Glass Co., Ltd.

The operation and effect of the light deflector 18 described above will be briefly described below. It will be easily understood from FIGS. 1 and 2 that when the rotating member 28 is rotated in the light deflector 18, one particular light transmitting means 30 among the eight light transmitting means 30 is effectively utilized in the first 45° rotation of the rotating member 28, and that a laser beam IL, which may be a parallel beam or scattered beam, to be put into the light deflector 18 is continuously inputted to the input terminal 30a of that particular light transmitting means 30 and is continuously outputted from the output terminal 30b of that particular light transmitting means 30 as a laser beam SIL to be rotatingly scanned over a 45° angular range from the angular position shown by a two-dot chain line SIL' in FIG. 1 to the angular position shown by a two-dot chain line SIL" in FIG. 1 with the rotation of the rotating member 28. In the next 45° rotation of the rotating member 28, the next adjacent light transmitting means 30 located downstream of the above-specified light transmitting means 30 viewed in the rotating direction of the rotating member 28 is effectively used. The laser beam IL put into the light deflector 18 is continuously inputted to the input terminal 30a of the next light transmitting means 30 and continuously outputted from the output terminal 30b of the next transmitting means 30 as a laser beam SIL to be rotatingly scanned over the 45° angular range from the angular position shown by two-dot chain line SIL' in FIG. 1 to the angular position shown by two-dot chain line SIL" shown in FIG. 1. Thus, with the rotation of the rotating member 28, the laser beam IL put into the light deflector 18 is successively outputted without a blanking time (waiting time) as a laser beam SIL to be rotatingly scanned over a 45° angular range.

In the light deflector 18 constructed in accordance with this invention, the number of the light transmitting means 30 provided in the rotating member 28 and their angular intervals are properly prescribed according to the desired scanning angular range of the output laser beam SIL and the permissible blanking time. For example, when the desired scanning angular range is 45 degrees and the permissible blanking time is zero, eight light transmitting members 30 may be provided at equiangular intervals, as in the above embodiment. When the desired scanning angle is 30 degrees and the permissible blanking time is zero, twelve light transmitting means 30 (360/30=12) may be provided at equiangular intervals. In order to output the laser beam SIL to be rotatingly scanned over the desired angular range, it is necessary that the input laser beam IL be continuously inputted to the input terminal 30a of a particular light transmitting means 30 while the rotating member 28 rotates over the desired scanning angular range. Hence, the laser beam IL put into the light deflector 18 should have a cross section of a desired size with respect to the cross-sectional area of the input terminal 30a of the light transmitting means 30. In order to continue to deliver the output laser beam SIL without a blanking time, the laser beam IL should always be inputted to at least one of the light transmitting means 30 during the rotation of the light deflector 18. The size in the rotating direction of the cross section of the laser beam IL put into the light deflector 18 should be substantially equal to, or larger than, the sum total of the size in the rotating direction of the cross section of the input terminal 30a of one light transmitting 30 and the distance in the rotating direction between the input terminals 30a of two adjacent light transmitting means 30. The size of the cross section of the laser beam IL put into the light deflector 18 can be increased or decreased to a desired one by using an optical element such as an optical lens. The cross section of the laser beam IL put into the light deflector 18 can be decreased to a desired size by putting the laser beam IL into the light deflector 18 through an opening having a desired cross sectional area and formed in a shield plate. It is possible in this case to predetermine the shape of the cross section of the opening formed in the shield plate according to the intensity distribution of the input laser beam IL in its cross section and thus to substantially uniform the intensity of the output laser beam SIL over the entire scanning angular range. On the other hand, when the cross section of the laser beam IL put into the light deflector 18 is predetermined, the above requirement may be met by properly setting the cross section and/or position of the input terminals 30a of the light transmitting means 30 disposed in the rotating member 28 (more specifically, the distance from the rotating axis of the rotating member 28).

Figure 5:
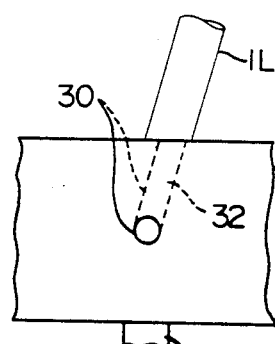
FIGS. 4, 5, 6, 7 and 8 are partial views, either in section or side elevation, of modified examples of the rotating member.
Figure 4:
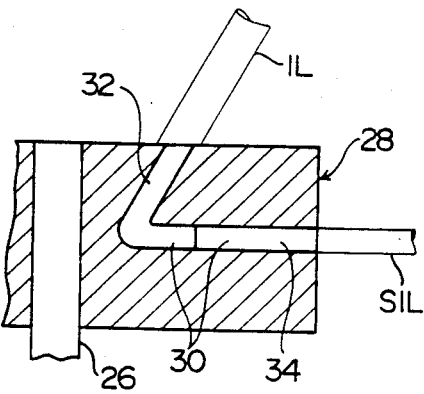

In the specific embodiment above, the laser beam IL is put into the light transmitting means 30 substantially in parallel to the rotating axis of the rotating member 28. If desired, it can be put into the light transmitting means 30 obliquely in an arbitrary direction with respect to the rotating axis of the rotating member 28. For example, as shown in FIG. 4, the laser beam IL can be put into the light transmitting means 30 while it is inclined radially with respect to the rotating axis of the rotating member 28, or as shown in FIG. 5, it can be put into the light transmitting means 30 while it is inclined in the rotating direction with respect to the rotating axis of the rotating member 28. When the laser beam IL is to be put into the light transmitting means 30 while it is inclined with respect to the rotating axis of the rotating member, the input portion of the optical fiber 32 disposed on the input side of the light transmitting means 30 can be caused to extend obliquely according to the inclination of the laser beam IL as illustrated in FIGS. 4 and 5. Likewise, in the illustrated embodiment, the laser beam SIL to be rotatingly scanned is outputted from the light transmitting means 30 substantially at right angles to the rotating axis of the rotating member 28. If desired, however, it is possible to incline the rod lens 34 disposed on the output side of the light transmitting means 30 in an arbitrary direction with respect to the rotating axis of the rotating member 28 and thus to incline the laser beam SIL outputted from the light transmitting means 30 in an arbitrary direction with respect to the rotating axis of the rotating member 28.

Figure 6:
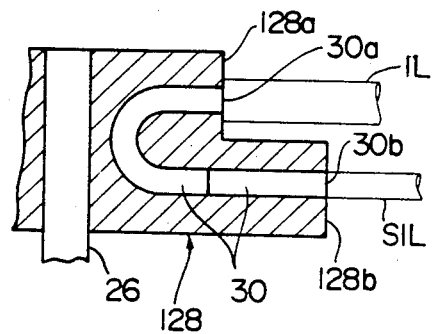

In the illustrated embodiment, the cylindrical rotating member 28 is used, and the input terminal 30a is disposed on the upper end surface 28a of the rotating member 28 and the output terminal 30b, on the peripheral side surface 28b of the rotating member 28. Instead of this design, both the input terminal 30a and the output terminal 30b of the light transmitting means 30 may be disposed on the peripheral side surface 28b of the rotating member 28. In this case, as shown in FIG. 6, a two-stage cylindrical rotating member 128 having a small-diameter portion and a large-diameter portion may be used so that the input terminal 30a of the light transmitting means 30 is disposed on the peripheral side surface 128a of the small-diameter portion, and the output terminal 30b of the light transmitting means 30, on the peripheral side surface 128b of the large-diameter portion. In the embodiment shown in FIG. 6, the laser beam IL is inputted to the input terminal 30a of the light transmitting means 30 substantially at right angles to the rotating axis of the rotating member 128, and the laser beam SIL to be rotatingly scanned is outputted from the output terminal 30b of the light transmitting means 30 substantially at right angles to the rotating axis of the rotating member 128. Of course, if desired, the input laser beam IL and/or the output laser beam SIL can be inclined in an arbitrary direction.

Figure 7:
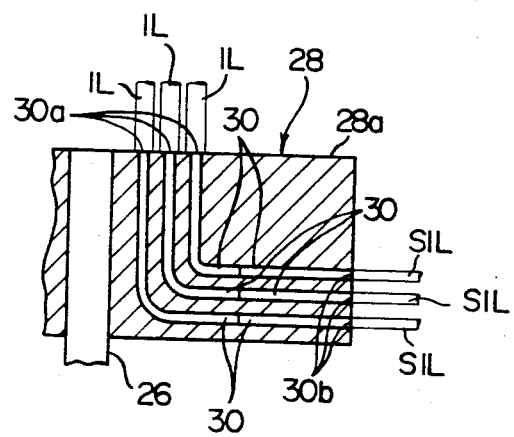
Figure 8:
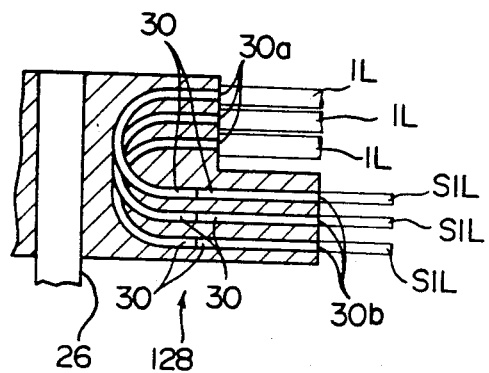

In the above-described embodiment, one laser beam IL is inputted and one laser beam SIL to be rotatingly scanned is outputted. If desired, as shown in FIGS. 7 and 8, it is possible to dispose a plurality of (three in the drawings) light transmitting means 30 at the same angular position of the rotating member 28 or 128 so that a plurality of laser beams IL are simultaneously inputted and a plurality of laser beams SIL to be rotatingly scanned are simultaneously outputted. In the embodiment illustrated in FIG. 7, a cylindrical rotating member 28 is used. The input terminals 30a of the light transmitting means 30 are disposed at predetermined intervals at the same angular position on the upper end surface 28a of the rotating member 28 in a direction at right angles to the rotating axis of the rotating member 28, and the output terminals 30b of the light transmitting means 30 are disposed on the peripheral side surface 28b of the rotating member 28 at predetermined intervals in the direction of the rotating axis of the rotating member 28. In the specific embodiment shown in FIG. 8, a two-stage cylindrical rotating member 128 is used. The input terminals 30a of the light transmitting means 30 are disposed on the peripheral side surface 128a of the small-diameter portion of the rotating member 128 at predetermined intervals in the direction of the rotating axis of the rotating member 128, and the output terminals 30b of the light transmitting means 30 are disposed on the peripheral side surface of 128b of the large-diameter portion of the rotating member 128 at predetermined intervals in the direction of the rotating axis of the rotating member 128. In the specific embodiment shown in FIGS. 7 and 8, the angular position at which the input terminals 30a of the light transmitting means 30 are disposed is conveniently the same as the angular position at which the output terminals 30b of the light transmitting means 30 are disposed. If desired, however, they may be different from each other.

The rotating member 28 or 128 provided with at least one light transmitting means 30 is generally conveniently in the form of a cylinder or a two-stage cylinder, as illustrated in the above embodiments. Its shape, however, is not limited to these specific examples, and a rotating member of another suitable shape such as a polygonal pyramid may be used as required.

With the light deflector 18 constructed in accordance with this invention, a scanning speed and a resolving power equivalent to, or higher than, those of a polygon mirror can be obtained in spite of the fact that it can be produced at a considerably lower cost. In the case of the polygon mirror, the relative position of an input laser beam and an output laser beam to be rotatingly scanned is limited, and the optical characteristics of the input laser beam are unequivocally determined by the optical characteristics of the input laser beam (if the input laser beam is a parallel beam, the output laser beam is also a parallel beam). In contrast, it is especially noteworthy that according to the light deflector 18 of the invention, the relative position of the input laser beam IL and the output laser beam SIL can be set as desired, and the input laser beam IL which may be a parallel or scattered beam can be delivered as a parallel output laser beam SIL or a converged output laser beam SIL to be rotatingly scanned, as the case may be. Accordingly, the other optical elements used on the upstream and/or downstream side of the light deflector 18 can be selected and/or designed with increased latitude.

What we claim is:

1. A light deflector comprising a two-stage cylindrical rotating member having a small diameter portion and a large diameter portion and including at least one light transmitting member, each light transmitting member having an input terminal located on the peripheral side surface of said small diameter portion and a corresponding output terminal located on the peripheral side surface of said large diameter portion such that when said rotating member rotates, a light beam, entering an input terminal exits from the corresponding output terminal, and is rotatingly scanned about the rotating axis of the rotating member.

2. The light deflector of claim 1 wherein the light transmitting member comprises an optical fiber adjacent said input terminal and a rod lens adjacent said output terminal.

3. The light deflector of claim 1 or 2 wherein the rotating member is provided with a plurality of light transmitting members having their input terminals and output terminals disposed at predetermined angular intervals.

4. The light deflector of claim 1 or 2 wherein the rotating member is provided with a plurality of light transmitting members having their input terminals disposed at the same angular position at predetermined intervals in the direction of the rotating axis of the rotating member and their output terminals disposed at the same angular position at intervals in the direction of the rotating axis.

5. The light deflector of claim 1 or 2 wherein the input terminal and the output terminal of each of said light transmitting members are disposed at the same angular position.

* * * * *